United States Patent [19]
Scalise

[11] Patent Number: 5,828,857
[45] Date of Patent: Oct. 27, 1998

[54] ASIC CELL IMPLEMENTATION OF A BUS CONTROLLER WITH PROGRAMMABLE TIMING VALUE REGISTERS FOR THE APPLE DESKTOP BUS

[75] Inventor: Albert M. Scalise, San Jose, Calif.

[73] Assignee: Apple Computer, Inc., Cupertino, Calif.

[21] Appl. No.: 583,375

[22] Filed: Jan. 5, 1996

[51] Int. Cl.[6] .................................................. G06F 13/00
[52] U.S. Cl. .......................... 395/309; 395/306; 395/559
[58] Field of Search .................................... 395/306, 309, 395/310, 880, 892, 555–556, 559

[56] References Cited

U.S. PATENT DOCUMENTS

| | | | |
|---|---|---|---|
| 5,193,199 | 3/1993 | Dalrymple et al. | 395/651 |
| 5,465,333 | 11/1995 | Olnowich | 395/281 |
| 5,479,619 | 12/1995 | Nagashige et al. | 395/309 |
| 5,517,623 | 5/1996 | Farrell et al. | 395/281 |
| 5,615,083 | 3/1997 | Burnett | 361/686 |

*Primary Examiner*—Ayaz R. Sheikh
*Assistant Examiner*—Sumati Lefkowitz
*Attorney, Agent, or Firm*—Mark A. Aaker

[57] ABSTRACT

An ASIC (Application Specific Integrated Circuit) cell implementation of an ADB (Apple Desktop Bus) bus controller with programmable timing value registers for the Apple Desktop Bus (ADB) has a system interface for connecting to a computer system including an address bus interface, a data bus interface, and a control bus interface, and has an ADB interface for connecting to an ADB peripheral bus. A control state machine within the ADB bus controller uses timing data from the programmable timing value registers to implement the Apple Desktop Bus data signaling and communications protocol on the ADB interface.

8 Claims, 2 Drawing Sheets

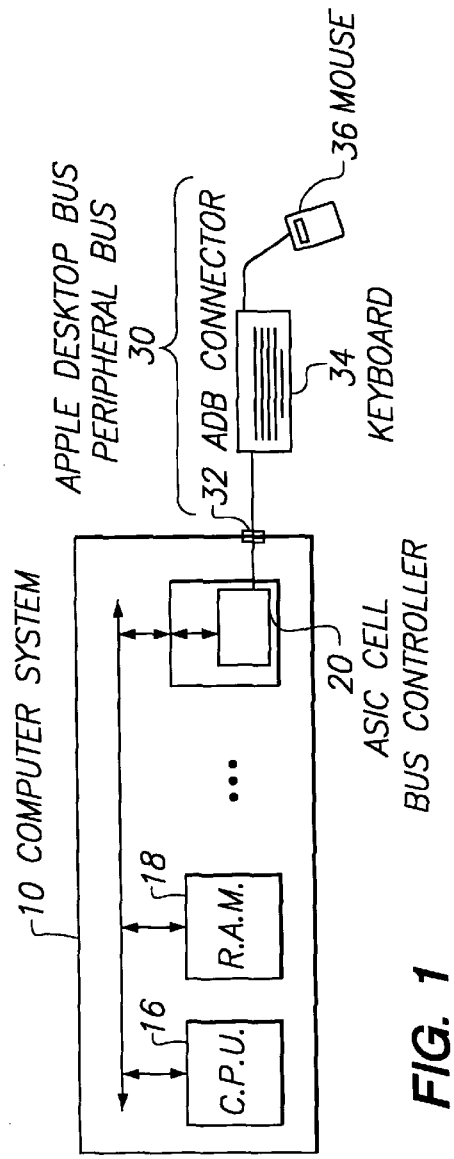

FIG. 1

| Timing Value Registers | Register Size | Physical Max | Physical Max Limit μS | Min In Spec | hex | Timing Value μS | Max In Spec | hex | Timing Value μS | Default Value | hex | Timing Value μS |
|---|---|---|---|---|---|---|---|---|---|---|---|---|
| Zero Low Time | 6 bits | 63 | 128.52 | 31 | 1F | 63.24 | 33 | 21 | 67.32 | 32 | 20 | 65.28 |
| One Low Time | 5 bits | 31 | 63.24 | 17 | 11 | 34.68 | 18 | 12 | 36.72 | 17 | 11 | 34.68 |
| Reset Pulse Width | 12 bits | 4095 | 8353.8 | 1471 | 5BF | 3000.8 | | | | 1471 | 5BF | 3000.8 |
| Synch Pulse Width | 6 bits | 63 | 128.52 | 31 | 1F | 63.24 | 32 | 20 | 65.28 | 32 | 20 | 65.28 |
| Attention Pulse Width | 9 bits | 511 | 1042.44 | 381 | 17D | 777.24 | 403 | 193 | 822.12 | 393 | 189 | 801.72 |
| Stop Pulse Width | 6 bits | 63 | 128.52 | 34 | 22 | 69.36 | 35 | 23 | 71.4 | 35 | 23 | 71.4 |
| Bit Cell Period TO | 7 bits | 127 | 259.08 | 35 | 23 | 71.4 | 63 | 3F | 128.52 | 64 | 40 | 130.56 |
| Stop To Start Pulse Width | 8 bits | 255 | 520.2 | 69 | 45 | 140.76 | 127 | 7F | 259.08 | 130 | 82 | 265.2 |

FIG. 3

ASIC CELL IMPLEMENTATION OF A BUS CONTROLLER WITH PROGRAMMABLE TIMING VALUE REGISTERS FOR THE APPLE DESKTOP BUS

FIELD OF THE INVENTION

This invention relates to the field of connecting peripheral devices to a computer system. More particularly, this invention relates to a bus controller for connecting an Apple Desktop Bus to a computer system. (Apple Desktop Bus is a Trademark of Apple Computer, Inc.)

BACKGROUND OF THE INVENTION

It is desirable to connect several peripheral devices such as a keyboard and a mouse to a computer system. These connections can be made via a peripheral device bus such as the Apple Desktop Bus (ADB). The ADB is an asynchronous serial communications bus controlled by a single ADB bus controller. A description of the physical and electrical characteristics of the ADB, and a description of the data signaling and communications protocol used on the ADB can be found in U.S. Pat. Nos. 4,875,158, 4,910,655, 4,912, 627, 4,918,598, 5,128,677 and 5,175,750 and in the publication "Inside Macintosh, Devices" by Apple Computer, Inc., copyright 1994, published by Addison-Wesley Publishing Company.

The ADB communications protocol requires specific data signaling rates and time periods. These rates and time periods are implemented by the ADB bus controller by reference to timing data or parameters used by the ADB bus controller. In past implementations of an ADB bus controller, this timing data has been "hard-coded", such as stored in a ROM attached to the ADB bus controller. However, since devices that do not meet the ADB specification may be connected to the ADB, and because the ADB protocol may be revised in the future, it is desirable that a means be provided for easily revising, changing or updating the timing data used by the ADB bus controller. This invention provides an ADB bus controller for the Apple Desktop Bus in which the timing data can be dynamically changed by storing the timing data in programmable timing value registers within the ADB bus controller.

An ADB bus controller has in the past been implemented in multiple integrated circuit devices including a microcontroller with a stored program, and has required extensive interaction with the central processing unit of the attached computer system. This invention provides an ADB bus controller which can be included with other elements within an Application Specific Integrated Circuit (ASIC), and which requires minimal interaction with the central processing unit of the attached computer system.

These and other advantages of the invention will be apparent to a person skilled in the field from a review of the following drawings, description and claims.

SUMMARY OF THE INVENTION

An ASIC cell implementation of an ADB bus controller for the Apple Desktop Bus has a system interface for connecting to a computer system, and an ADB Interface for connecting to an Apple Desktop Bus.

The system interface connects the ASIC cell ADB bus controller to an attached computer system, which can include connecting the ADB bus controller to other elements on the ASIC chip, connecting the ADB bus controller to a bus which connects to other elements on a motherboard, such as a central processing unit (CPU), or connecting the ADB bus controller to a bus which connects between computer system boards, such as a PCI bus. In one form, the system interface includes an address bus interface, a data bus interface and a control bus interface for connecting to corresponding computer system busses.

Within the ASIC cell ADB bus controller are a command/data register, programmable timing value registers, and a control state machine. The command/data register is used for temporarily holding data within the ADB bus controller and for transferring data to the computer system via the system interface and to the Apple Desktop Bus via the ADB interface. The programmable timing value registers store timing data which is loaded from the attached computer system. The control state machine uses the stored timing data to implement the Apple Desktop Bus data signaling and communications protocol on the ADB interface.

An ADB bus controller in accordance with this invention allows the timing data stored in the timing value registers to be easily changed, thereby accommodating different ADB devices or changes in the ADB protocol. Because the timing data and the control state machine needed to implement ADB signaling are within the ADB bus controller, the ADB bus controller can implement ADB signaling on the ADB interface without interaction with the attached computer system.

BRIEF DESCRIPTION OF THE DRAWINGS

FIG. 1 illustrates connecting a computer system 10 through an ASIC cell ADB bus controller 20 to an Apple Desktop Bus peripheral bus 30.

FIG. 3 illustrates timing data which may be used to implement the signaling and protocol used on the Apple Desktop Bus.

DETAILED DESCRIPTION

Figure 2:
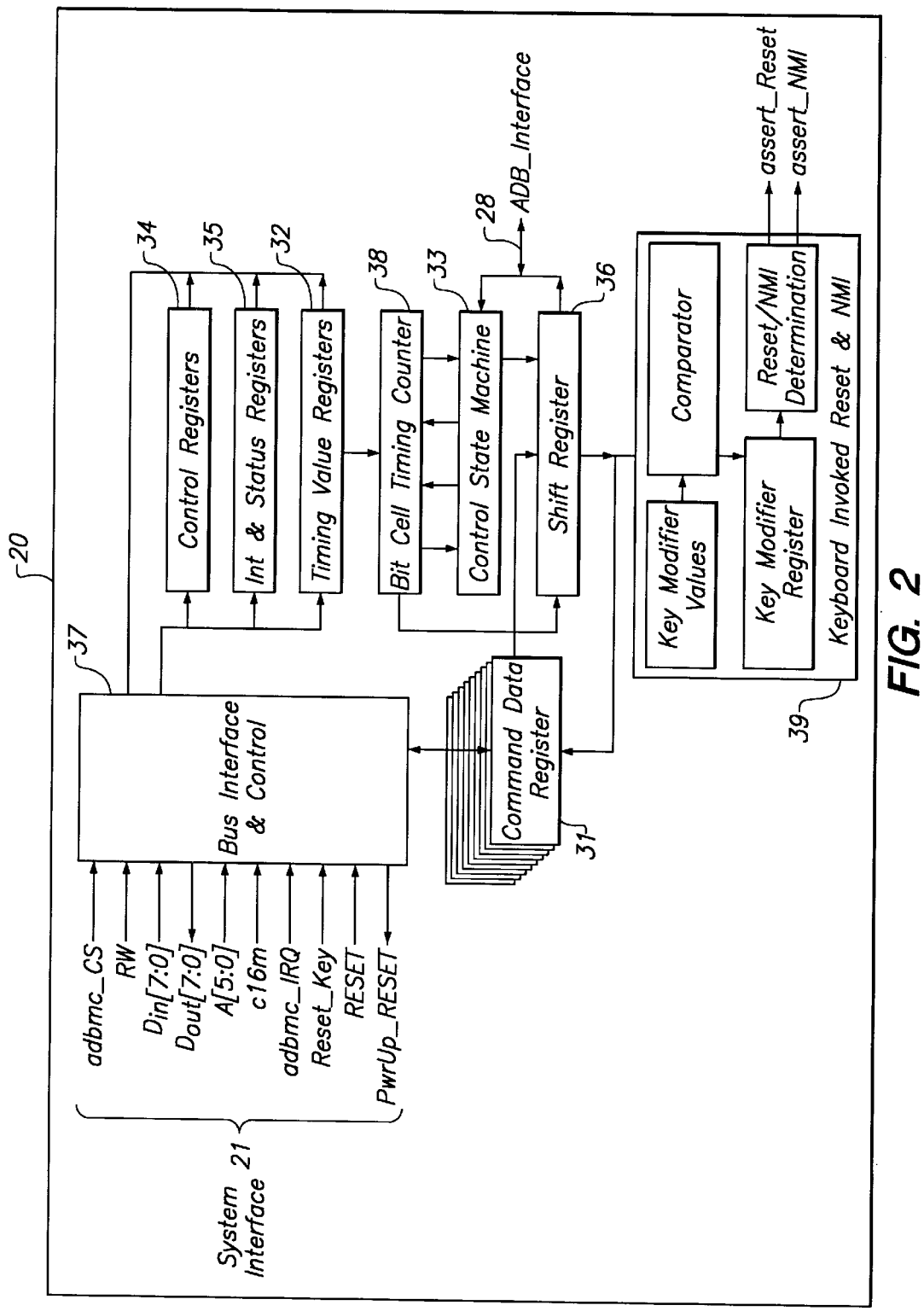
FIG. 2 illustrates the internal elements of an ASIC cell ADB bus controller 20 in a preferred implementation in accordance with this invention.

FIG. 1 illustrates connecting a computer system 10 through an ASIC cell ADB bus controller 20 to an Apple Desktop Bus peripheral bus 30. The ADB bus controller 20 resides in an application specific integrated circuit which may be on a motherboard or plug-in card of the computer system 10. The Apple Desktop Bus peripheral bus 30 uses a standard ADB connector 32 on the exterior of the computer system enclosure to connect to peripheral devices such as a keyboard 34 and mouse 36. The computer system 10 can be a conventional personal computer such as a Power Macintosh (TM) by Apple Computer, Inc. having elements such as a Central Processing Unit (CPU) 16 and random-access memory (RAM) 18. The ADB bus controller 20 uses a system interface for connecting to the computer system 10, which in various implementations includes connecting the ADB bus controller to other elements on the ASIC chip, connecting the ADB bus controller to a bus which connects to other elements on a motherboard, or connecting the ADB bus controller to a bus which connects between computer system boards, such as a PCI bus.

FIG. 2 illustrates the internal elements of an ASIC cell ADB bus controller 20 in a preferred implementation in accordance with this invention. ADB bus controller 20 has a System Interface 21 for connecting the ADB bus controller 20 to a computer system 10, and has an ADB interface 28 for connecting to an Apple Desktop Bus peripheral bus 30.

The System Interface 21 includes an address bus interface for connecting to an address bus, a data bus interface for connecting to a data bus and a control bus interface for connecting to a control bus. The address bus interface is implemented by address lines labeled A[5:0] indicating 6 address lines in parallel for addressing up to 32 locations within the cell. The data bus interface is implemented by data-in lines labeled Din[7:0] and data-out lines labeled Dout[7:0]. Each transfers 8 lines of data in parallel. The control bus interface is implemented by a chip select line labeled adbmc_CS to indicate that an address within the range assigned to the ADB bus controller 20 has been decoded, a read/write line labeled RW for indicating whether data is being read from, or written to the ADB bus controller, and a clock line labeled c16 m for establishing the timing of transfer operations. The System Interface 21 to the ADB bus controller 20 also includes various reset and interrupt related lines labeled adbmc_IRQ, Reset_Key, RESET, and PwrUp_RESET. Of course, in other implementations of an ASIC cell implementation of an ADB bus controller, other allocations of lines and connections can be used to tailor the ADB bus controller to a particular ASIC or attached computer system. The operation of the System Interface is controlled by Bus Interface & Control circuitry 37, which coordinates data transfers through the System Interface 21.

The ADB bus controller 20 has an ADB Interface 28 for connecting to an Apple Desktop Bus peripheral bus 30. The ADB Interface 28 is a wire-OR'ed, pulse width modulated signal line used for bi-directional signaling which connects to a standard ADB socket connector 32 on the exterior of a computer system enclosure. ADB devices such as a keyboard and mouse are connected to this standard ADB socket connector 32.

Other important elements within the ADB bus controller 20 are a Command/Data Register 31, programmable Timing Value Registers 32, and a Control State Machine 33.

The Command/Data Register 31 is used for temporarily holding data within the ADB bus controller 20, and for transferring data between the System Interface 21 and ADB Interface 28. A Command/Data Register 31 of a size of nine bytes has been found to be sufficient for implementing ADB data transfers in this preferred implementation. Since only one Command/Data Register 31 is available, access to the register and the use of the register is arbitrated by the ADB bus controller 20.

The programmable Timing Value Registers 32 are used for holding timing data which is transferred from the attached computer system 10. Several Timing Value Registers are provided so that several timing values and parameters can be stored and used within the ADB bus controller 20. The Timing Value Registers 32 provide data to a Bit Cell Timing Counter 38 and the Control State Machine 33.

The Control State Machine 33 uses the Bit Cell Timing Counter 38 and timing data from the Timing Value Registers 32 to implement the Apple Desktop Bus data signaling and communications protocol on the ADB Interface 28. The Control State Machine 33 controls transfers of data from the Command/Data Register 31 to a Shift Register 36 for transfer to the ADB Interface 28, and conversely, moves data from the ADB Interface 28 through the Shift Register 36 to the Command/Data Register 31. The Control State Machine 33 performs many ADB-related operations such as reading data from the ADB, writing data to the ADB, performing an Autopoll sequence for the ADB, and resetting the ADB.

Also within the ADB bus controller 20 is circuitry labeled Keyboard Invoked Reset & NMI 39 for recognizing particular keyboard key combinations. These key combinations are processed into non-maskable interrupt requests and reset requests for the attached computer system 10.

In operation, data from a peripheral device such as a keyboard 34 on the ADB peripheral bus 30 is passed to the computer system 10 as follows. The ADB device indicates that it has data to send, and the Control State Machine 33 operates the ADB protocol on ADB Interface 28 to bring the data through the ADB Interface 28 and Shift Register 36 to the Command/Data Register 31. Then, under control of the Bus Interface & Control circuitry 37, the data is moved through the System Interface 21 to the computer system 10.

In reverse, data from the attached computer system 10 is passed to the ADB peripheral bus 30 as follows. Data from the computer system 10 arrives at the System Interface 21, and under the control of the Bus Interface & Control circuitry 37 is loaded into the Command/Data Register 31. Then, Control State Machine 33 operates the ADB protocol on ADB Interface 28 to bring the data through the Shift Register 36 to the ADB Interface 28.

It should be noted that these data transfer operations require ninimal interaction with the attached computer system 10, since all ADB-related operations are handled by the ADB bus controller itself.

The programmable Timing Value Registers 32 are used for holding timing data which is used by the Bit Cell Timing Counter 38 and Control State Machine 33 to implement the ADB data signaling and communications protocol on the ADB Interface 28. These registers can be read or written by data transfers from the attached computer system 10, but are read-only for use by the Control State Machine 33 or other elements within the ADB bus controller 20. The Timing Value Registers 32 are loaded with a default value upon power-up or initialization of the ADB bus controller 20. When it is desired to change the timing data used by the ADB bus controller 20 in implementing the ADB data signaling and communications protocol, data is transferred as follows. New timing data from the attached computer system 10 is passed via the System Interface 21 and Bus Interface & Control 37 to the Timing Value Registers 32. The Control State Machine 33 then operates the ADB protocol according to the new timing data stored in the Timing Value Registers 32 and immediately changes its timing in recognition of the new timing data. In this way the timing data associated with the Apple Desktop Bus data signaling and communications protocol can be easily changed. Preferably, the timing values are changed during an initialization period or idle period of the ADB bus controller. An alternative implementation could implement a form of "dynamic control" of the ADB protocol by changing timing values during ADB signaling and protocol operations. Changes could be made at different stages within an ADB transfer or signaling cycle.

The ADB bus controller also uses Control Registers 34 and Interrupt & Status Registers 35 to facilitate its operations, and these registers can also transfer data via the Bus Interface & Control 37 and System Interface 21.

FIG. 3 illustrates timing data which may be used to implement the signaling and protocol used on the ADB. The Control State Machine 33 and Bit Cell Timing Counter 38 use the timing values to implement Apple Desktop Bus data signaling and Apple Desktop Bus communications protocol on the ADB interface 28. For example, the "Zero Low Time" specifies the amount of time that the ADB interface 28 is held in a low state to indicate a Zero data bit. This value can be stored in 6 bits of a data register, and can therefore have a physical value between 0 and 63. These physical values are converted to correspond to timing values in microseconds, such as multiplying by 2.04 microseconds, so that a maximum value of 63 would correspond to a maximum time period of 128.52 microseconds. The ADB specifications specify minimum and maximum values for a parameter such as a minimum timing value of 63.24 microseconds and a maximum value of 67.32 microseconds, corresponding to values between 31 and 33, which are encoded in hexadecimal representation between 1F and 21. The default value is 32 (hex 20) corresponding to a timing of 65.28 microseconds. The duration of the Zero Low Time can be changed by changing the value of the corresponding bits stored in the programmable Timing Value Registers 32 to a new value. This would allow the operation of ADB devices outside of the standard ADB specification and allow revision of the operation of the ADB, for example by allowing slower signaling, asymmetric signaling rates or wave forms, or other protocol changes.

Other variations will be apparent to one skilled in the art from a consideration of the preceding description. It is intended that the scope of the invention should be limited only as set forth in the claims which follow.

What is claimed is:

1. An ASIC (Application Specific Integrated Circuit) cell implementation of an ADB (Apple Desk top Bus) bus controller for an Apple Desktop Bus, comprising;

a system interface for connecting the ADB bus controller to a computer system, including an address bus interface for connecting to an address bus, a data bus interface for connecting to a data bus and a control bus interface for connecting to a control bus;

an ADB interface for connecting to an Apple Desktop Bus;

a command/data register for holding data within the ADB bus controller and transferring data to the computer system via the system interface and to the Apple Desktop Bus via the ADB interface;

programmable timing value registers for holding timing data which is transferred from the computer system; and a control state machine using the timing data to implement Apple Desktop Bus data signaling and Apple Desktop Bus communications protocol on the ADB interface.

2. An ASIC cell implementation of an ADB bus controller as in claim 1 where said data bus interface transfers data in parallel form and said ADB interface transfers data in serial form.

3. An ASIC cell implementation of an ADB bus controller as in claim 1 where said ADB bus controller is within an integrated circuit package mounted on a plug-in card in said computer system.

4. An ASIC cell implementation of an ADB bus controller as in claim 1 including means for changing the timing data in the programmable timing value registers by transfer of a new value from the computer system via the data bus interface to the programmable timing value registers for use by the control state machine to implement the Apple Desktop Bus data signaling and Apple Desktop Bus communications protocol on the ADB interface.

5. A method of operating an ASIC (Application Specific Integrated Circuit) cell implementation of an ADB (Apple Desktop Bus) bus controller for an Apple Desktop Bus, comprising;

connecting a system interface to a computer system, including an address bus interface for connecting to an address bus, a data bus interface for connecting to a data bus and a control bus interface for connecting to a control bus;

connecting an ADB interface to an Apple Desktop Bus;

transferring data to and from the computer system via the system interface to a command/data register for holding data within the ADB bus controller and transferring data to and from the command/data register to the Apple Desktop Bus via the ADB interface;

transferring timing data from the computer system to programmable timing value registers for storing the timing data; and implementing Apple Desktop Bus data signaling and Apple Desktop Bus communications protocol on the ADB interface by a control state machine using the timing data stored in the programmable timing value registers.

6. A method of operating an ASIC cell implementation of an ADB bus controller as in claim 5 where said transferring data to and from the computer system via the system interface occurs in parallel form and said transferring data to and from the command/data register to the Apple Desktop Bus via the ADB interface occurs in serial form.

7. A method of operating an ASIC cell implementation of an ADB bus controller as in claim 5 where said ADB bus controller is within a single integrated circuit package mounted on a plug-in card in said computer system.

8. A method of operating an ASIC cell implementation of an ADB bus controller as in claim 5 wherein the timing data stored in the programmable timing value registers is changed by transfer of a new value from the computer system via the system interface to the programmable timing value registers for use by the control state machine to implement the Apple Desktop Bus data signaling and Apple Desktop Bus communications protocol on the ADB interface.

* * * * *